(12) United States Patent
Bellotti et al.

(10) Patent No.: US 8,670,140 B2
(45) Date of Patent: Mar. 11, 2014

(54) WORKFLOW MANAGEMENT BRIDGING VIRTUAL AND TRANSIENT-PAPER DOCUMENTS

(75) Inventors: Victoria Mary Elizabeth Bellotti, San Francisco, CA (US); Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1226 days.

(21) Appl. No.: 12/420,765

(22) Filed: Apr. 8, 2009

(65) Prior Publication Data

US 2010/0259779 A1   Oct. 14, 2010

(51) Int. Cl.
*G06F 3/12* (2006.01)

(52) U.S. Cl.
USPC ........... 358/1.15; 358/1.6; 358/1.9; 358/1.13; 358/1.16; 358/1.18; 358/3.28; 399/45; 347/101; 430/19

(58) Field of Classification Search
None
See application file for complete search history.

(56) References Cited

U.S. PATENT DOCUMENTS

| | | | |
|---|---|---|---|
| 5,364,132 A * | 11/1994 | Haas et al. | 283/67 |
| 7,166,420 B2 | 1/2007 | Chopra et al. | |
| 7,202,006 B2 | 4/2007 | Chopra et al. | |
| 7,205,088 B2 | 4/2007 | Iftime et al. | |
| 7,214,456 B2 | 5/2007 | Iftime et al. | |
| 7,229,740 B2 | 6/2007 | Iftime et al. | |
| 7,300,727 B2 | 11/2007 | Kazmaier et al. | |
| 7,316,875 B2 | 1/2008 | Iftime et al. | |
| 7,381,506 B2 | 6/2008 | Iftime et al. | |
| 7,432,027 B2 | 10/2008 | Chopra et al. | |
| 2005/0114760 A1 | 5/2005 | Arregui et al. | |
| 2005/0141906 A1* | 6/2005 | Murakami | 399/45 |
| 2006/0081696 A1* | 4/2006 | Sakurai et al. | 235/375 |
| 2007/0072110 A1 | 3/2007 | Iftime et al. | |
| 2007/0195370 A1 | 8/2007 | Suga et al. | |
| 2008/0191136 A1 | 8/2008 | Shrader et al. | |
| 2009/0295851 A1* | 12/2009 | Edwards et al. | 347/9 |
| 2010/0238489 A1* | 9/2010 | Meyerhofer et al. | 358/1.15 |
| 2011/0305851 A1* | 12/2011 | Wang et al. | 428/32.31 |

FOREIGN PATENT DOCUMENTS

EP   1 591 829   11/2005

OTHER PUBLICATIONS

European Search Report for EP Application No. EP 10 15 9332, 6 pages, Jun. 29, 2010.

* cited by examiner

*Primary Examiner* — Miya J Cato

(74) *Attorney, Agent, or Firm* — Marger Johnson & McCollom PC

(57) ABSTRACT

A transient document management system can include a transient document identifier placement module for placing a transient document identifier on a transient physical document, a transient document information retrieval module for extracting information from the transient physical document, and a transient document processing module for performing data processing based on the information extracted from the transient physical document.

19 Claims, 5 Drawing Sheets

WORKFLOW MANAGEMENT BRIDGING VIRTUAL AND TRANSIENT-PAPER DOCUMENTS

TECHNICAL FIELD

The disclosed technology relates to the field of transient documents and, more particularly, to various techniques pertaining to workflow management of transient document based systems.

BACKGROUND

As used herein, transient document media is media that is suitable for use with transient printing technology, such as reusable paper. Thus, a transient document is a document that consists of transient document media. One type of transient document is a special type of reusable paper that is treated with a chemical capable of changing color when exposed to a light source or to a heat source. Such exposure of the transient ink to the source results in the creation of an image (e.g., text and/or graphics) that can last for a certain period of time (e.g., one or two days) before fading away and ultimately disappearing. Alternatively, a user can proactively erase at least a portion of the image on the transient document by exposing the transient document to a particular source such as a light source or a heat source.

With the emergence of transient documents, the same physical document can be used repeatedly over the course of multiple cycles of user interaction. By allowing a user to use the same physical document over and over again, a transient document based system enables the user to effectively reduce the amount of paper that would otherwise be used to print multiple copies of a document such as successive revisions thereof.

The use of transient documents is particularly effective for documents that need only be available for a limited time. For example, a user can print a non-final draft of a legal brief using a transient document. The user can subsequently print each successive revision of the draft on the same transient document before achieving the final draft. Once the final draft is completed, the user can print a copy of the final draft in a more permanent manner using regular ink on traditional paper, for example.

The use of transient documents for printing legal documents can provide an additional benefit in that such use prevents virtually any revision of each legal document printed using a transient document from being discoverable. This is because the text of each version of the document that is printed on the transient document would disappear at a certain point, such as after a certain amount of time has passed or after the transient ink has been proactively erased by exposure to a light source or to a heat source, for example. The real estate and mortgage industries are other industries that can greatly benefit from the use of transient documents, as those particular industries often use a large amount of paper for multiple revisions of various types of documents.

However, despite the many advances that can result from the use of transient documents in different industries, there remains a need for effective workflow management bridging transient document media and electronic systems.

DETAILED DESCRIPTION

Embodiments of the disclosed technology can pertain to the merging of transient document workflow with electronic systems that may use a traditional database system and can include the use of transient documents to mediate certain steps of the workflow process that involve the use of electronic forms or documents. The use of transient document technology can enable users to reuse sheets of paper and thereby help to save the environment by reducing paper waste. The use of transient documents can also save a user or company money by reducing or eliminating charges associated with printing supplies, ink, and toner, for example.

As used herein, a transient document identifier is an identifying mark composed of text and/or other markings, such as an image or halftone pattern, that is affixed to (e.g., printed on) a transient document. A transient document identifier can encode identification information that can be used to identify the transient document to which the transient document identifier is affixed. A transient document identifier can encode additional information about the transient document, such as the document form type. A transient document identifier can be a permanent marking, a transient marking, or a combination thereof, and can be automatically generated by an electronic system or created by a user.

In certain embodiments, a transient document can be used for a form to be filled in by a user using a traditional ink pen or a transient marker pen. For example, the transient document can be a form having permanent ink marks for stable elements and transient ink marks for variable elements. A transient document identifier can be affixed to the transient document to provide the system with information about the transient document such as when and where the transient document is printed. The system can then send messages to remind a user to re-scan the transient document into the system in order to avoid losing any transient information by virtue of the transient ink fading, for example. With each scan of a transient document, the system can also collect any new information from the transient document and store the new information in a storage repository such as a database or a filesystem, for example. Thus, the use of a transient document identifier in connection with a transient document based workflow system can effectively provide the system with a measure of awareness and control that is not presently available.

Figure 1:
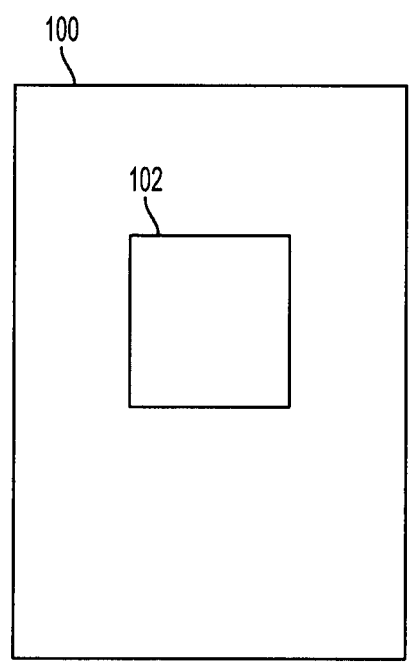
FIG. 1 illustrates an example of a transient document having a transient document identifier affixed thereto.

FIG. 1 illustrates an example of a transient document 100 having a transient document identifier 102 affixed thereto. The transient document identifier 102 can be of a permanent nature (e.g., printed using traditional ink) or of a transient nature (e.g., composed of transient ink). The transient document identifier 102 can include, for example, a mark such as a glyph that can encode information pertaining to the transient document 100 to which it is affixed.

In certain embodiments, the transient document identifier 102 can include decorative black-and-white or color images and/or text to match a corporation's or other institution's identity. Such decorative images can also improve the aesthetic appearance of the transient document 100 itself. A different transient document identifier 102 can be printed on each page of the transient document 100 and can contain unique stenographic information used to identify the particular page each time some or all of the transient document 100 is scanned back into the system, for example.

The information that the transient document identifier 102 encodes can include identity information that specifically identifies the transient document 100 itself such as a pre-assigned serial number, for example. The transient document identifier 102 is generally printed in non-human readable form such as a halftone pattern embedded within an image. In certain alternative embodiments, however, the transient document identifier 102 can be a more overt code such as a barcode and can contain a human-readable element to facilitate geographic tracking of the transient document 100, for example.

In certain embodiments, the transient document identifier 102 can be generated or determined and affixed to the transient document 100 using backward stroke and/or forward stroke techniques, for example. In alternative embodiments, the transient document identifier 102 can be generated and affixed to the transient document 100 by application of a halftone algorithm.

Figure 2:
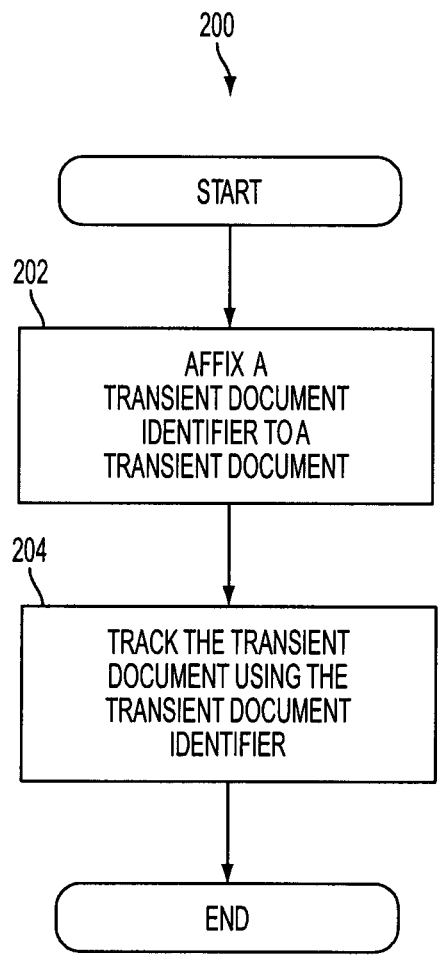
FIG. 2 illustrates a first example of a method of workflow management involving the use of transient document media.

FIG. 2 illustrates a first example of a method 200 of workflow management involving the use of transient document media. At 202, a transient document identifier is affixed to a transient document. The transient document identifier can be of a permanent nature (e.g., printed using traditional ink) or of a transient nature (e.g., composed of transient ink or other suitable material).

At 204, the transient document identifier can be used to track the transient document. For example, the transient document identifier can be affixed to the transient document when a first draft of a document is printed on the transient document. Also, a record of the printing can be stored (e.g., in a storage repository such as a database) with a timestamp. The record can also contain information pertaining to where the transient document was printed as well as an identification of the party that printed it. For example, the record can indicate which user and/or which department sent the print command to the printer that printed the transient document, as well as an identification of the printer that printed the transient document.

The record can also store information pertaining to details of the printing, such as how many copies of the transient document were printed and what kind of transient document media was used to print the transient document. In scenarios where multiple copies of the document are each printed on a transient document, a distinct transient document identifier can be used with each respective copy and a separate record can be created in the database for each respective copy.

Alternatively, the same transient document identifier can be used for each copy of a particular document printed on a transient document where the copies are identical. For example, if an entire department is to be polled about a certain topic, multiple copies of a questionnaire (e.g., form fill) can be printed on transient document media. Once each user finishes writing his or her answers on his or her personal copy, the transient document can be scanned into the system and the system can commingle the data in one of several different ways. For example, the system can partially or completely overwrite any previously existing user-submitted data. Alternatively, the system can augment the previously existing data with the new data.

A transient document can be scanned into the system virtually any number of times. However, once the transient document expires (e.g., the ink has faded away or the document has been proactively erased), any scanning of the document will not provide additional information from the document. In certain embodiments, the system can take note of an expected expiration date for a given transient document and send an advisory message to a corresponding user, such as the last user known to have scanned the transient document, alerting him or her to the anticipated expiration of the transient document.

Figure 3:
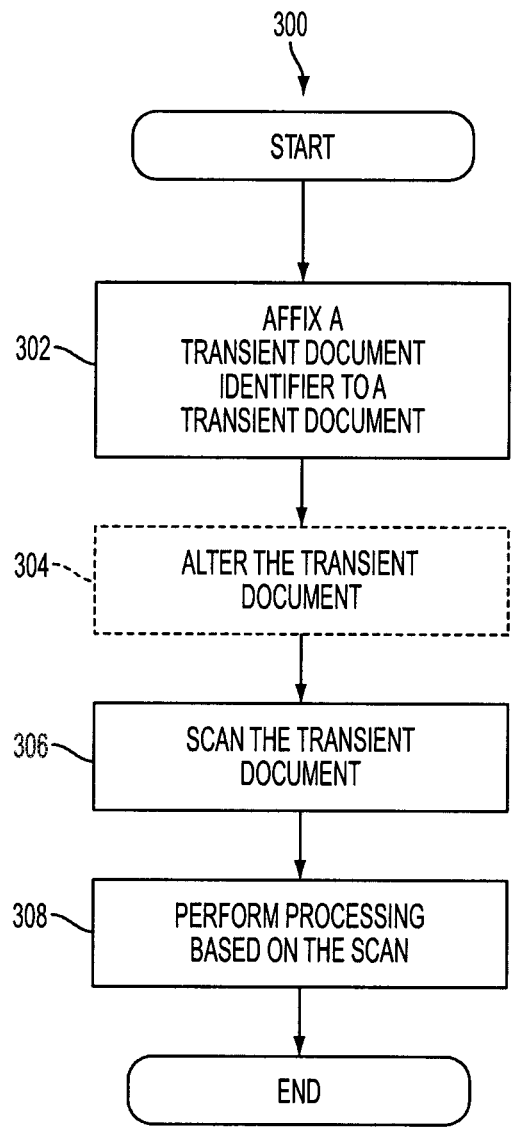
FIG. 3 illustrates a second example of a method of workflow management involving the use of transient document media.

FIG. 3 illustrates a second example of a method 300 of workflow management involving the use of transient documents. Step 302 is similar to step 202 of FIG. 2 in that a transient document identifier (a transient and/or permanent marking) is affixed to a transient document.

At 304, the transient document is altered. For example, a user can add information to the transient document by writing and/or drawing directly on the transient document. Alternatively, the system can add information to the transient document without any user interaction. In certain embodiments, the transient document can be a form having sections such as check boxes, lines for text, and open fields that a user can complete. The user can fill out the form by writing directly onto the transient document or otherwise marking the transient document with the requested information, for example. Alternatively, some or all of the sections can be left blank by the user, indicating that the user has no answer at that time or that the user refuses to answer. The transient document can have a check box for a user to mark upon finishing his or her review and altering, if any, of the transient document.

In certain embodiments, the transient document can have predetermined information, such as a presentation or a paper, presented in a manner such that the reader can annotate or add notes to the transient document and also directly mark up the predetermined information itself if so desired. For example, a user can print out a copy of a Microsoft PowerPoint presentation as a handout on a transient document such that there are presentation slides on one side of the transient document and sections on the other side having lines that can be used for note-taking purposes. A user can use a transient ink pen for taking notes in the designated sections.

At 306, the transient document is scanned into the system using a standard document scanner, for example. In certain embodiments, a cellular phone, digital camera, personal digital assistant (PDA), or other electronic device can be used to scan the transient document. Thus, the use of transient document workflow can augment a PDA-based system in which PDA communication can be used to scan transient document identifiers on corresponding transient documents. For example, the PDA communication can inform the system of the location of the transient document at the time it was scanned or other attributes of the transient document.

The use of electronic devices other than traditional document scanners, particularly non-traditional devices such as cellular phones, is generally limited only by the resolution of the camera feature of the device. In other words, the device must have a high enough resolution to be able to provide the system with an image that is sharp enough for the system to be able to identify the transient document identifier on the transient document, particularly if the transient document is printed using certain techniques such as half-toning.

In certain embodiments where a transient document has been successfully scanned, the system can then be set to automatically erase the transient document, such as by using the proactive erasing techniques discussed above. Alternatively, the system can be instructed to not erase the transient document unless certain conditions are met such as authentication of the party providing the scan and/or successful capture of any new information provided by the transient document.

At 308, processing of the transient document can be performed based on the transient document scanning at 306. For example, the system can first identify the transient document based on the transient document identifier. Once the system identifies the transient document, the system can then access a record by pulling up a database entry corresponding to the transient document. An example of such a database entry is described below with respect to FIG. 5.

After the system has accessed the record corresponding to the transient document, the system can then update the record. For example, if a user has written on or otherwise added any information such as by markings on the transient document, the system can capture the new information and store it accordingly. In certain embodiments, an entire image of the transient document (referred to as a virtual document) can be stored each time the transient document is scanned. Alternatively, optical character recognition (OCR) techniques can be used to store some or all of the information on the transient document as text, for example.

In yet further embodiments, the system can perform subtraction or differencing techniques (e.g., by analyzing strokes) to determine what, if any, new material is presented by the transient document. Certain embodiments can include the use of different colors of ink. For example, a first color of ink can be used for static information on the form, such as section headers, and a second color of ink can be used by the user such as by a transient marking pen. Thus, the system can limit processing to focus on only new information as indicated by the second color of ink.

In embodiments where the transient document identifier includes decorative marks and/or text, the system can be set to either cancel out the decorative marks/text if not needed or if a user wants to minimize stored information, for example. Alternatively, the system can be set to preserve the decorative marks/text so that the marks/text can be viewed by a user when the user accesses the stored information online.

The system can be set to store only new material if the new material meets certain conditions. For example, a user can instruct the system to only store new material if the system determines that the new material is more than a smudge or other apparently unintentional marking. In scenarios where the transient document is a form with certain sections to be filled out by a user, the system can perform differencing techniques in order to ignore static information that was originally printed, such as section headings, and instead focus on the sections that were provided for the user's input.

In certain embodiments, an existing record can be updated or a new record can be created as new information is received for the corresponding transient document. As mentioned above, an entire scan of a transient document can be stored each time it is scanned or certain techniques such as differencing can be used to identify only new material. For successive scans, however, the system can be set to create a new record for each successive scan in order to store an entire image for the corresponding scan. Alternatively, the system can store a "baseline" image and create a new record for each scan, wherein each new record stores only changes to the "baseline" image. Thus, the system can re-create virtually any version or revision of the document by applying the new record to the "baseline" image as well as any other new records, if applicable.

In certain embodiments, the system can combine transient ink marks and permanent ink marks and record them together with any handwritten marks using a transient writing instrument such as a transient marker pen. The system can then store a representation of the transient document that includes the additional handwritten marks. Once the handwritten marks are stored, the user no longer needs to worry about the fact that the handwritten notes will fade away and he or she can start reusing the transient document to print another version of the document or an entirely different document. In certain embodiments, a new transient document identifier can be generated and affixed to the transient document for each printed version.

Figure 4:
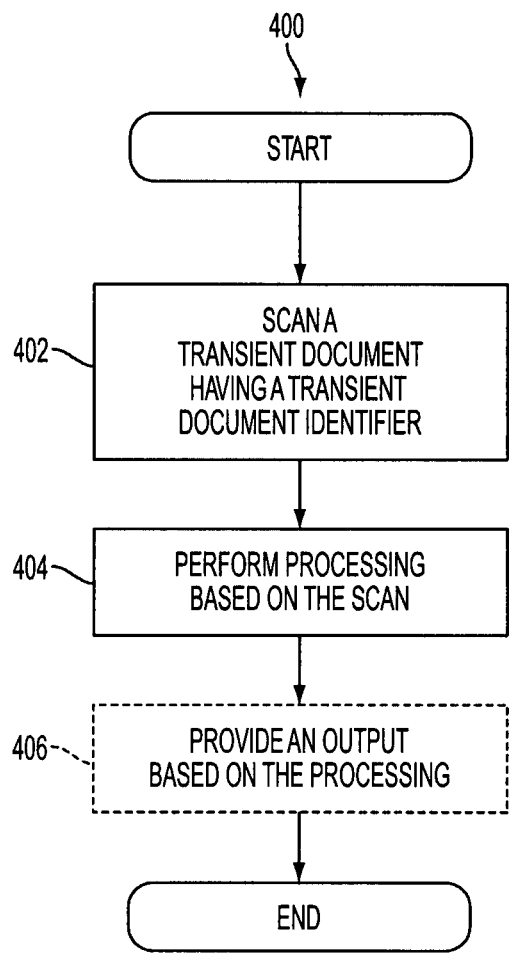
FIG. 4 illustrates a third example of a method of workflow management involving the use of transient document media.

FIG. 4 illustrates a third example of a method 400 of workflow management involving the use of transient documents. Step 402 is similar to step 306 of FIG. 3 in that a transient document is scanned into a system, such as by using a document scanner.

At 404, the system can perform processing pertaining to the transient document based on the scan of the transient document. This step is similar to step 308 of FIG. 3, which is discussed in detail above.

At 406, the system can provide an output based on the processing performed at 404. For example, the system can keep track of the time elapsed since the original printing of a transient document and, as the transient document approaches its expiration point, a message or reminder can be sent to a particular user, such as a user designated as being responsible for the transient document, alerting him or her to the fact that the transient document will expire soon, particularly if the transient document has not been re-scanned into the system within a certain amount of time. The system can thus ensure that any new transient information that a user enters on a form is not lost simply because the user neglected to scan the completed form back into the system before the transient information on the form has faded.

A timeout reminder message as described above can provide the user with options based on the approaching expiration of the transient document. For example, the message can provide the user with a recommendation that the user scan the transient document as soon as possible and no later than a certain designated time, such as the actual expiration time or a predetermined amount of time before the actual expiration time. The system can thus advise a user as to how long he or she has before the transient ink fades and whether the user needs to pass the transient document on to another user for any additional markup before the transient ink fades. The system can also provide a recommendation as to whether a user should recycle the paper, such as after a certain number of printings, for example.

In certain embodiments where a transient document is approaching its expiration, the system can also send a message regarding the anticipated expiration to the user's supervisor, an administrator, and/or the entire department of which the user is a part. Such settings can be set by an administrator or other authorized user or provided as a default. The system is thus able to provide a level of redundancy for transient document workflow management that is not presently available.

In scenarios where only a certain number of designated users are authorized to use a particular transient document, the system can be set to monitor which user account or accounts are used to scan the transient document each time it is scanned so that the system can send an alert to an administrator or manager, for example, if a non-authorized user is identified as the scanning party. In such a situation, the system can be set to either accept the scan or reject the scan completely. If set to accept the scan, the system can also be set to flag the scan as being a scan by a potentially unauthorized user.

Figure 5:
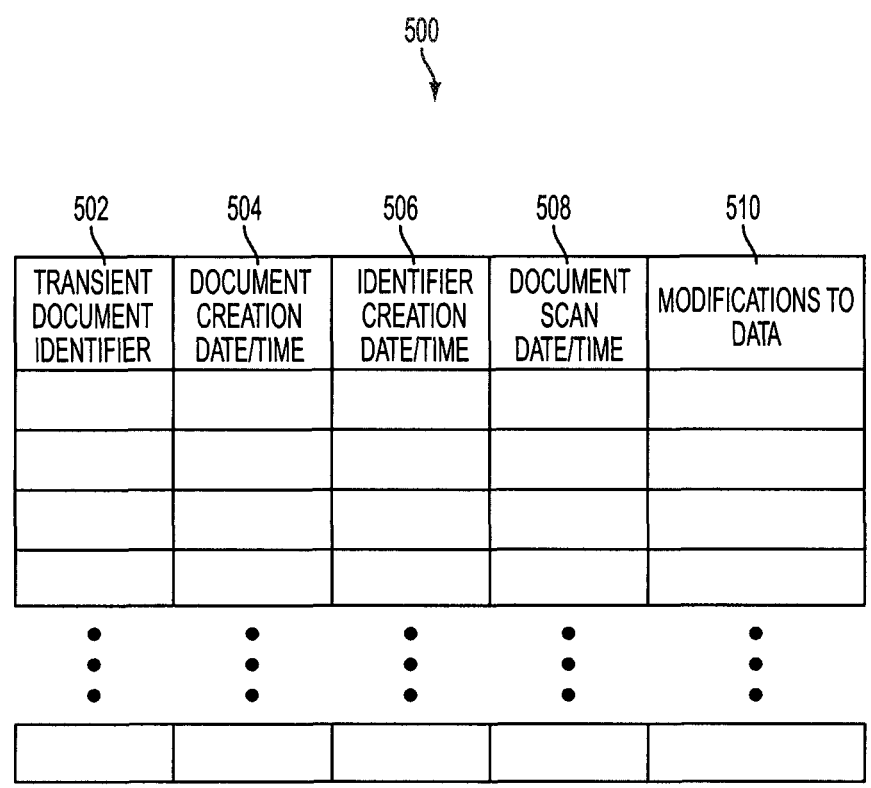
FIG. 5 illustrates an example of a database table for storing transient document information in accordance with embodiments of the disclosed technology.

FIG. 5 illustrates an example of a database table 500 for storing transient document information in accordance with embodiments of the disclosed technology. In the example, each record has the following data fields: Transient Document Identifier 502, Document Creation Date/Time 504, Identifier Creation Date/Time 506, Document Scan Date/Time 508, and Modifications to Data 510.

The Transient Document Identifier field 502 can be used to store a name assigned to a transient document. The name can be an alphanumeric character string, for example. The Document Creation Date/Time field 504 can be used to store information pertaining to when the transient document is first printed. Each time the corresponding transient document expires by natural fading or proactive erasing, for example, a record corresponding to the expired version can be deleted.

The Identifier Creation Date/Time field 506 can be used to store information pertaining to when the corresponding transient document identifier is first printed. As with the Document Creation Date/Time 504 field, a new record can be added or an existing record can be overwritten each time an electronic document is printed on a particular transient document page, particularly in situations where the transient document identifier is a permanent marking.

The Document Scan Date/Time field 508 can be used to store information pertaining to the date/time that a particular transient document is scanned. In certain embodiments, such information can be stored each time the transient document is scanned into the system. Alternatively, such information can be stored only when the transient document is identified as having new information associated therewith.

The Modifications to Data field 510 can be used to store any new information discovered after a scan of the corresponding transient document. For example, a new record can be created each time the transient document is scanned or, alternatively, an existing record can be overwritten using differencing techniques. Also, as discussed above, an image of the entire transient document can be stored, in which case the Modifications to Data field 510 can be used to store either the entire image from the scan or a reference to a file location in which the image is stored, for example.

One having ordinary skill in the art will readily appreciate that the fields shown in the database table 500 of FIG. 5 are exemplary and are not limiting. A large number and variety of data fields can be used to store various types of information pertaining to a particular transient document and/or transient document identifier. For example, a Geographic Tracking field (not shown) can be used to store information pertaining to where a transient document is printed. Such a field can include information as to which individual printer and/or which department was involved with a particular printing. The Geographic Tracking field can be used each time the transient document is printed or when certain conditions are met, such as situations where the system determines that there is new information, for example.

The database table 500 can also include an Expiration Date/Time field (not shown) that can be used to store information pertaining to when a particular transient document is set to expire (e.g., naturally or proactively). In certain embodiments where a transient document is scanned at a time that is later than the anticipated expiration time, the system can be set to provide a message alerting a user (e.g., a supervisor) of a potentially invalid scan (e.g., a scan of a document that is expected to have expired prior to the scan). Thus, the system can provide transient document security that is not currently available by employing safeguards against user attempts to abuse the system by making copies of a transient document and attempting to assert them outside of a valid timeframe, for example.

In certain embodiments, a separate record can be created for each page of a transient document. Thus, many of the techniques described herein as pertaining to a transient document can be applied to a single page or set of pages of a transient document. For example, the system can be set to store only changes to certain pages, such as pages that contain new information, each time the entire transient document is scanned. In embodiments where a new record is created each time a scan of a transient document provides new information, the number of records that are created and/or updated can thus be minimized, thereby increasing both system efficiency and processing time.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, hand-held devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A transient document management system, comprising:
a processor configured to control:
a transient document information retrieval module operable to extract information from a transient physical document before the transient physical document expires, the transient physical document having an expiration date after which the information is no longer available to be extracted, due to natural fading or proactive erasing the transient physical document also having a transient document identifier printed thereon; and
a transient document processing module operable to identify the transient physical document based on the transient document identifier and to perform data processing based on the information extracted from the transient physical document; and
a memory configured to store the information extracted from the transient physical document, the extracted information comprising at least one of the following: information pertaining to when the transient physical document was first printed, information pertaining to when the transient document identifier was printed, and information pertaining to a date/time that the transient physical document was last scanned, wherein the processor is further configured to cause a message to be sent to a user, the message reminding the user to re-scan the transient physical document in order to avoid losing any transient information due to natural fading or proactive erasing.

2. The transient document management system of claim 1, wherein the processor is further configured to control a transient document identifier placement module operable to print the transient document identifier on the transient physical document.

3. The transient document management system of claim 2, wherein the transient document identifier placement module comprises a printing module operable to print the transient document identifier on the transient physical document using at least one of transient ink and permanent ink.

4. The transient document management system of claim 2, wherein the transient document identifier placement module comprises a plug-in component operable to be used in connection with a document printer.

5. The transient document management system of claim 1, wherein the data processing comprises a differencing operation to identify new information added to the transient physical document since printing of an electronic document on the transient physical document.

6. A computer-implemented method, comprising:
performing a scan of a transient physical document before the transient physical document expires due to natural fading or proactive erasing, the transient physical document having an expiration date, the transient physical document having a transient document identifier printed thereon;
identifying the transient physical document based on the transient document identifier;
extracting information from the transient physical document based on the scan of the transient physical document;
printing the transient document identifier on the transient physical document using at least one of transient ink and permanent ink;
reminding a user to re-scan the transient physical document in order to avoid losing any transient information due to natural fading or proactive erasing; and
storing the extracted information in a storage repository, the extracted information comprising at least one of the following: information pertaining to when the transient physical document was first printed, information pertaining to when the transient document identifier was printed and information pertaining to a date/time that the transient physical document was last scanned.

7. The computer-implemented method of claim 6, wherein storing the extracted information comprises creating one or more records in the storage repository, at least one of the one or more records corresponding to the scan of the transient physical document.

8. The computer-implemented method of claim 6, further comprising retrieving at least one of an image representing the scan of the transient physical document and metadata pertaining to the scan.

9. The computer-implemented method of claim 8, wherein the metadata comprises at least one of location information pertaining to where the scan occurred, temporal information pertaining to when the scan occurred, and identity information pertaining to who requested the scan.

10. The computer-implemented method of claim 8, further comprising performing a computer processing action responsive to at least one of the extracted information, the image, and the metadata.

11. The computer-implemented method of claim 10, wherein the computer processing action comprises at least one of advancing a workflow process item, stopping a workflow process item, deleting a workflow process item, and creating a new workflow process item.

12. The computer-implemented method of claim 6, further comprising transmitting an alert to a user, the alert indicating the expiration date of the transient physical document.

13. The computer-implemented method of claim 6, wherein the extracting comprises performing a differencing operation between the scan of the transient physical document and a subsequent scan of the transient physical document.

14. The computer-implemented method of claim 6, further comprising determining whether the transient physical document was printed by an authorized user.

15. One or more tangible computer-readable media storing thereon machine-executable instructions that, when executed by a processor, perform the computer-implemented method of claim 6.

16. A method of transient document workflow management, comprising:
printing on a transient physical document a transient document identifier, the transient document identifier comprising a halftone pattern embedded within an image;
altering the transient physical document using at least one of transient ink and permanent ink;
scanning the altered transient physical document before the transient physical document expires due to natural fading or proactive erasing, the transient physical document having an expiration date;
identifying the transient physical document based at least in part on the transient document identifier;

extracting information from the altered transient physical document based on the scanning;

reminding a user to re-scan the transient physical document in order to avoid losing any transient information due to natural fading or proactive erasing; and performing an action based on the information extracted from the altered transient physical document.

17. The method of claim 16, wherein performing the action comprises updating metadata based on the information extracted from the altered transient physical document.

18. The method of claim 16, further comprising storing the information extracted from the altered transient physical document.

19. The method of claim 16, further comprising erasing the transient physical document.

\* \* \* \* \*